United States Patent
Khosravi et al.

(10) Patent No.: US 10,076,970 B2
(45) Date of Patent: Sep. 18, 2018

(54) METHOD AND SYSTEM FOR AN ENERGY STORAGE SYSTEM

(71) Applicant: Ford Global Technologies, LLC, Dearborn, MI (US)

(72) Inventors: Maziar Khosravi, Cologne (DE); Florian Huth, Aachen (DE); David van Bebber, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 15/362,357

(22) Filed: Nov. 28, 2016

(65) Prior Publication Data
US 2017/0151884 A1 Jun. 1, 2017

(30) Foreign Application Priority Data
Nov. 30, 2015 (DE) .......... 10 2015 223 697

(51) Int. Cl.
| | | |
|---|---|---|
| B60L 11/18 | (2006.01) | |
| B60K 6/48 | (2007.10) | |
| B60L 11/12 | (2006.01) | |
| G01C 21/34 | (2006.01) | |

(52) U.S. Cl.
CPC .......... *B60L 11/1861* (2013.01); *B60K 6/48* (2013.01); *B60L 11/12* (2013.01); *B60L 11/184* (2013.01); *B60L 11/1842* (2013.01); *G01C 21/3469* (2013.01); *B60L 2250/16* (2013.01); *B60L 2270/10* (2013.01)

(58) Field of Classification Search
CPC .. B60L 11/1861; B60L 11/1842; B60L 11/12; B60L 11/184; B60L 2270/10; B60L 2250/16; G01C 21/3469; B60K 6/48
See application file for complete search history.

(56) References Cited

U.S. PATENT DOCUMENTS

| | | | |
|---|---|---|---|
| 8,450,974 B2 | 5/2013 | Stewart et al. | |
| 2003/0233959 A1 | 12/2003 | Kumar | |
| 2011/0050174 A1* | 3/2011 | King .................. | B60L 11/1811 320/134 |
| 2012/0316717 A1* | 12/2012 | Daum .................. | B60L 11/1842 701/22 |
| 2016/0178678 A1* | 6/2016 | Pelletier .............. | B60L 11/1842 705/39 |
| 2016/0185230 A1* | 6/2016 | Reichow ............ | G01R 31/3662 307/10.1 |
| 2017/0050529 A1* | 2/2017 | Lambert ............... | H02J 7/0047 |

FOREIGN PATENT DOCUMENTS

| | | |
|---|---|---|
| DE | 202013002465 U1 | 4/2013 |
| DE | 102014214071 A1 | 1/2016 |

OTHER PUBLICATIONS

"eHighway: Innovative Electric Road Freight Transport," Siemens AG, Germany, 2015, www.siemens.com/mobility/eHighway, 8 pages.

* cited by examiner

*Primary Examiner* — Rodney A Butler
(74) *Attorney, Agent, or Firm* — Julia Voutyras; McCoy Russell LLP

(57) ABSTRACT

Methods and systems are provided for a network in communication with one or more vehicles. In one example, a method may include transferring energy back and forth between the one or more vehicles and the network.

20 Claims, 5 Drawing Sheets

METHOD AND SYSTEM FOR AN ENERGY STORAGE SYSTEM

CROSS REFERENCE TO RELATED APPLICATION

The present application claims priority to German Patent Application No. 102015223697.8, filed on Nov. 30, 2015. The entire contents of the above-referenced application are hereby incorporated by reference in its entirety for all purposes.

FIELD

The present description relates generally to methods and systems for an energy storage system of one or more vehicles communicating with a network.

BACKGROUND/SUMMARY

The scope of efforts to reduce $CO_2$ emissions of vehicles includes advancing the electrification of vehicles, whereby internal combustion engines are intended to be replaced to an increasingly greater extent by electric motors. One of the greatest disadvantages of electrically driven vehicles, however, is that the energy density of stores for electrical energy, such as accumulators, for example, is substantially lower than the energy density of stores that store other energy carriers such as fossil fuels or hydrogen. In order to provide electrically operated vehicles with an acceptable range, the stores for electrical energy is designed to be very large. As a result, not only is a great deal of space needed in the vehicle, which is then no longer available as cargo space, for example, but also the stores for electrical energy have a high dead weight, which results in an increase in the consumption of electrical energy.

Various measures can be taken to keep the stores for electrical energy small and, therefore, lightweight. For example, the hybrid vehicles are equipped not only with an electric motor, but also with an internal combustion engine as well, and so it is possible to use the internal combustion engine or the electric motor for driving the vehicle, depending on the driving state. As a result, both the engine and the motor can be operated largely at their optimal operating points. In city traffic, where frequent accelerations and decelerations are initiated, the electric motor can be operated in a more optimal and, therefore, economical manner than the internal combustion engine, whereas the internal combustion engine can be operated in a more optimal and, therefore, economical manner than the electric motor at high and constant speeds. One disadvantage of hybrid vehicles, however, is that they demand all the components for operating the electric motor and the internal combustion engine, whereby their weight increases and the reduction in weight achieved by reducing the size of the electrical-energy store is at least partially offset by the large number of components. In addition, a complex control system is used to activate either the engine or the motor, whichever may be operated more economically depending on the driving state. The increased number of components and the complex control may increase the likelihood that one or more functions of the hybrid vehicle degrades.

Another possibility for keeping the electrical-energy store small and, therefore, lightweight is to obtain electrical energy directly on the road and introduce it into the electric motor, for example via overhead contact lines or induction elements buried in the ground. The economic impact to equip the road network in this manner is extremely high, however, and so supplying electric motors with electrical energy in this manner is an option only for certain roads. Examples thereof are, in particular, highly traveled roads such as superhighways.

In addition to optimizing the combustion process, the kinetic energy generated during a braking procedure, for example, can be converted into electrical energy and can be fed to the electrical-energy store (recuperative braking). The fuel consumption can therefore be reduced, because the electrical energy does not need to be provided by a generator driven by the internal combustion engine.

Depending on the driving state, however, the situation can occur whereby the electrical-energy store is completely filled, and electrical energy provided by the braking procedure, for example, is otherwise wasted (herein referred to as an energy surplus). In this case, it may be economical to switch on a consumer that is not demanded per se, for example, the rear-window heater, to consume the excess electrical energy which cannot be fed to the store or to entirely dispense with the conversion of kinetic energy into electrical energy. As a result, the kinetic energy remains unused, or the electrical energy is wasted, without having achieved any noteworthy additional benefits. Thus, during the energy surplus, electrical energy that may otherwise be used to power one or more vehicle functions is wasted.

In one example, the issues described above may be addressed by a method for operating the vehicle in a driving state according to instructions of a driver and/or an assistance system, ascertaining the quantity of electrical energy stored in a store of the vehicle via a store-monitoring device, comparing the ascertained quantity of the stored electrical energy with a pre-definable limit value via a control unit, for the case in which the quantity of the electrical energy stored in the vehicle exceeds the pre-definable limit value, feeding a selectable quantity of electrical energy from the vehicle into an external energy-uptake device having an energy-transfer device.

In this way, a ubiquitous network configured to couple to vehicles on a roadway is described. The network and vehicles are in communication when coupled and may determine a direction of energy transfer based on a diagnostic routine. In one example, the vehicle may transfer energy to the network during an energy surplus driving mode (e.g., electrical energy substantially equal to the pre-definable limit value), where an energy storage device is fully charged and engine operating conditions are producing excess energy (e.g., recuperative braking). Alternatively, the network may provide energy to the vehicle in response to the vehicle comprising less than a desired amount of energy (e.g., vehicle does not comprise a sufficient amount of energy to reach a desired final destination determined via a vehicle operator input into a navigation system). In this way, energy from a vehicle may be transferred to and stored in the network, where the network may distribute the stored energy back to the same vehicle or to a different vehicle.

The problem addressed by one embodiment of the present disclosure includes a system for operating a vehicle having an internal combustion engine via which the excess electrical energy that exists during operation of a vehicle comprising an internal combustion engine transferred to other vehicles through a network. In one example, the network is configured to supply electrically driven vehicles with electrical energy, where the network is adapted to receive electrical energy during an energy surplus as described above.

Within the scope of the present disclosure an internal combustion engine is considered to be an engine which burns fossil fuels, for example, as well as hydrogen or other energy carriers (e.g., alcohols, coal, and gas) to provide torque which drives wheels of the vehicle. The internal combustion engine may not be the only drive source for the vehicle. Instead, the vehicle is a hybrid vehicle which comprises an electric motor in addition to the internal combustion engine.

Depending on the configuration of the vehicle, said vehicle can be operated in a certain driving state according to the instructions of a driver and/or an assistance system. The driving state of the vehicle can be characterized, for example, by the instantaneous speed or the time that has passed since the vehicle was started. This also includes operating the vehicle via autonomous driving with the use of the assistance system.

Initially, the quantity of the electrical energy stored in the store (e.g., a state of charge), in particular in the vehicle battery of the vehicle, is continuously ascertained with the aid of the store-monitoring device. The voltage of the stored electrical energy can be measured for this purpose.

Subsequently, it is determined whether the quantity of the electrical energy stored in the store exceeds a pre-definable limit value, or not. This pre-definable limit value defines a reserve which must not be accessed, in order to ensure the safe operation of the vehicle and, in particular, of the electronic components installed in the vehicle. As soon as an actual value drops below the pre-definable limit value, the intended use of the vehicle can no longer be guaranteed for a sufficiently long period of time, for example, until the destination is reached. However, if the quantity of the electrical energy stored in the vehicle exceeds the limit value, then a certain portion of the electrical energy can be delivered and is not demanded for the operation of the vehicle. In this case, a selectable quantity of electrical energy is fed from the vehicle into an external energy-uptake device. The selectable quantity in this case can be an established portion of the difference of the quantity of the stored electrical energy and the limit value, whereby it can be ensured that the quantity of electrical energy delivered is not too high and, therefore, that the reserve is not accessed. The electrical energy is transferred via the energy-transfer device to the external energy-uptake device. The transfer can take place, for example, via induction elements or via a current collector which is brought into contact with a current lead.

In this way, it is possible to feed excess energy that is not needed for the operation of a vehicle comprising an internal combustion engine into an external energy-uptake device, where it can be used in a different way. This can take place, for example, by way of this fed electrical energy being made available to other vehicles that are driven exclusively or partially by an electric motor. The external energy-update device can also contain a storage device, in which the energy can be stored or temporarily stored. This storage or temporary storage can also be implemented via a conversion into another energy-storage form, such as, for example, via a power-to-gas or a power-to-fuel method. Due to the alternate usage of the excess energy that is available during operation of the vehicle comprising an internal combustion engine, it can be ensured that this energy does not need to be uselessly consumed, for example, prevent an overcharging of the electrical-energy store.

In a further embodiment, the method may include determining the quantity of electrical energy that was consumed via a usage meter, and adjusting the quantity of electrical energy fed into the external energy-uptake device via the control unit with consideration for the ascertained quantity of consumed electrical energy via the control unit.

In this case, the quantity of the electrical energy fed into the external energy-uptake device can be dynamically changed by the control unit. In this case, the control unit accounts for the quantity of electrical energy that was consumed, in particular over a certain period of time before the adjustment is carried out. If the control unit establishes that a very large quantity of electrical energy is drawn from consumers of the vehicle, such as the air conditioning system or the rear-window heater, in this time period, the quantity of electrical energy that is fed can be reduced, to prevent the limit value from being quickly reached. For the case in which little electrical energy is drawn from the consumers, the quantity of fed electrical energy can be increased. Therefore, the quantity of fed electrical energy is selected neither too high nor too low. The proper performance of the electrical components of the vehicle is met prior to feeding energy into the external energy-uptake device.

In one alternative embodiment, the store-monitoring device can ascertain the quantity of energy stored in further stores of the vehicle, wherein the quantity of stored energy is taken into account by the control unit. In this case, not only the electrical energy, but also energy stored in other forms is taken into account. The electrical-energy store of a vehicle operated by an internal combustion engine can be charged by way of the internal combustion engine driving a generator. If the fuel tank of the vehicle is well-filled, for example, and it is therefore possible to use a portion of the fuel for charging the electrical-energy store, the electrical-energy store can be discharged to a greater extent than for the case in which the fuel tank is only slightly filled. Alternatively, it is possible to use a portion of the fuel tank in response to a market value of fuel. For example, if the price of fuel is less than the price of electrical energy reserves, then a portion of fuel is consumed to provide energy to the external energy uptake device, thereby allowing a vehicle operator to realize financial gains. In this way, by accounting for the quantity of stored energy, the quantity of electrical energy that can be fed into the external energy-uptake device can be maximized without jeopardizing the proper performance of the vehicle.

In a further embodiment, the method may detect the driving state of the vehicle and generate corresponding driving-state signals using driving-state detection device, and feed the driving-state signals to the control unit which takes the driving-state signals into account when changing the pre-definable value and the fed, selectable quantity.

Driving-state detection device can detect, for example, the speed of the vehicle, and the speed, operating time, and oil temperature of the internal combustion engine. On the basis of these parameters, the future consumption of the internal combustion engine can be forecast. As a result, it is also possible to maximize the quantity of electrical energy that can be delivered. In turn, a greater quantity of electrical energy can be delivered when the consumption by the internal combustion engine is low, since a certain quantity of fuel can be used for charging the electrical-energy store and is not needed for driving the vehicle.

One embodiment is distinguished by the fact that the quantity of consumed electrical energy and/or the driving state with respect to a pre-definable time are/is taken into account. It therefore makes sense to average the quantity of electrical energy that is consumed and the parameters characterizing the driving state, such as speed and engine speed, over a pre-definable time. As a result, short-term outliers, resulting from an acceleration procedure, for example, can be omitted from consideration in the ascertainment of the quantity of electrical energy that can be delivered. As a result, the future consumption by the internal combustion engine may be predicted. In addition, the situation may be prevented, whereby the quantity of electrical energy that can be delivered is changed too frequently.

In a further embodiment, the method may detect the instantaneous position of the vehicle and the planned destination and generate corresponding position and destination signals via a navigation system and feed the position and destination signals to the control unit which takes the position and destination signals into account when changing the pre-definable value and the fed, selectable quantity.

It is not only known how much further away the destination is from the current position of the vehicle, but also what the properties are of the trip segment to the destination. The grades, the number of curves, and the road status of the trip segment are of particular interest. It is also known whether the trip segment extends mainly cross-country or through the city. As a result, it is possible to calculate the fuel consumption of the internal combustion engine until the destination is reached, whereby the quantity of electrical energy that is delivered can be adjusted accordingly.

In another embodiment, the vehicle is operated in such a way that the quantity of energy, in particular fuel, that is consumed is minimized. For this purpose, the internal combustion engine can be operated, for example, at the optimal operating point for as long as possible, which can be achieved in the case of hybrid vehicles, for example, by utilizing the electric motor for acceleration procedures. In addition, the situation can be prevented whereby the internal combustion engine is operated at unfavorable speeds, which can be implemented via a corresponding transmission control and/or by suitable interventions by the assistance system.

In an alternative embodiment, the control unit controls the navigation system in such a way that the route guidance is adjusted as a function of the ascertained quantity of consumed electrical energy and the quantity of energy stored in the store and/or energy stored in the further stores. It can occur that the route guidance originally proposed by the navigation system has been sought out, for example, on the basis of the criterion of reaching the destination within the shortest amount of time. This can mean, however, that the fuel consumption of the internal combustion engine is greater as compared to an alternative route guidance. In order to nonetheless increase the quantity of electrical energy that can be delivered, the navigation system can change the route guidance in such a way that the quantity of consumed energy and, in particular, the fuel consumption of the internal combustion engine are reduced.

In one example, the energy-uptake devices may be located at points, for a certain transition time. If the navigation system then establishes that no energy-uptake devices are present on the originally provided trip segment, but that excess energy that could be delivered is present, the route guidance can be changed in such a way that it passes by one or more energy-uptake devices. The transition time may include installation of the energy-uptake devices along a roadway. Thus, the transition time encompasses a range of time including an absence and a ubiquity of the uptake devices.

In another embodiment, the vehicle is operated in such a way that the quantity of electrical energy consumed is minimized. The less electrical energy needed for operating the vehicle comprising an internal combustion engine, the greater the amount of excess energy that can be delivered. The quantity of consumed electrical energy can be reduced, for example, via a suitable control of the air conditioning system. Depending on the configuration of the vehicle, a corresponding message can be issued to the driver, or the air conditioning system is automatically regulated accordingly.

One embodiment of the present disclosure relates to a system for operating a vehicle comprising an internal combustion engine and, in particular, a system for carrying out a method comprising a store-monitoring device for ascertaining the quantity of electrical energy stored in a store of the vehicle which is operated in a driving state according to instructions from a driver and/or an assistance system, a control unit for comparing the ascertained quantity of the stored electrical energy with a pre-definable limit value, energy-transfer device for feeding a selectable quantity of electrical energy from the vehicle into an external energy-uptake device, wherein the control unit acts, in a controlling manner, on the energy-transfer device in such a way that, in the event that the quantity of electrical energy stored in the vehicle exceeds the pre-definable limit value, the selectable quantity of electrical energy is fed from the vehicle into the external energy-uptake device.

The technical effects and advantages which can be achieved using the system according to the present disclosure correspond to those explained above. In summary, it should be noted that excess energy that is not needed for operating the vehicle comprising an internal combustion engine can be delivered to other vehicles that are operated using an electric motor, so that said energy is not wasted.

One embodiment of the present disclosure relates to a network for supplying electrically driven vehicles with electrical energy, comprising a transfer network for transferring electrical energy, a number of energy-uptake devices, with which electrical energy from one or more vehicles, which comprise an internal combustion engine and are designed, in particular, according to the previously depicted embodiment, can be fed into the transfer network, and a number of energy-exchange devices, via which electrical energy can be exchanged with the vehicles driven by electrical energy. Existing networks, which comprise, for example, overhead contact lines or induction elements for exchanging electrical energy between vehicles, for example, passenger cars, trucks, or trains, and the network, are designed for supplying electrical energy to the vehicles that are operated exclusively using electric motors. According to the present disclosure, it is possible, however, to also integrate vehicles into the network, which comprise an internal combustion engine and are not reliant on drawing electrical energy from the network. The network makes it possible to deliver excess energy that is not demanded for operating the vehicle comprising an internal combustion engine to other vehicles that are operated using an electric motor, so that said energy is not wasted. A contribution is made to the efficient utilization of electrical energy. In addition, the network makes it possible to equip the electrically operated vehicles with an electrical-energy store which is small and, therefore, lightweight. As a result, the consumption of electrical energy is reduced and the available electrical energy is utilized more efficiently.

A further embodiment is distinguished by the fact that the network comprises one or more network stores for electrical energy. The network stores make it possible to also feed electrical energy into the network when a demand for electrical energy does not exist. In addition, electrical energy can also be drawn when electrical energy is not being fed in.

The network store therefore has a buffer effect and equalizes differences in the fed-in and withdrawn quantity of electrical energy.

In a further embodiment, the network store contains an energy-converting device which is suitable for carrying out a power-to-gas method or a power-to-fuel method, or is connected to such an energy-converting device, and so the storage can take place in another form of energy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for diagnosing vehicle energy output and regeneration, and transferring energy to and from the vehicle to a network comprising a plurality of energy-uptake devices. A vehicle comprising the features shown in FIGS. 1 and/or 3 may be used with the network shown in FIG. 2. The energy uptake devices are ubiquitous, in one example. Alternatively, the energy uptake devices are strategically located along a roadway, where the strategy biases areas of high population density and heavy vehicle traffic. The energy uptake devices function as a medium between the network and the on-road vehicles for transferring energy. As described in FIGS. 4A and 4B, a method for monitoring energy consumption and/or output conditions are monitored. If the vehicle comprises an insufficient amount of energy to reach a final destination, then the method may direct energy from the energy-uptake devices to flow to the vehicle. Alternatively, if the vehicle is in an energy surplus where an energy storage device is substantially equal to a predefined limit (e.g., 100% full), then the vehicle flows excess energy to the energy-uptake device, where the energy may be provided to other vehicles on the roadway.

Figure 1:
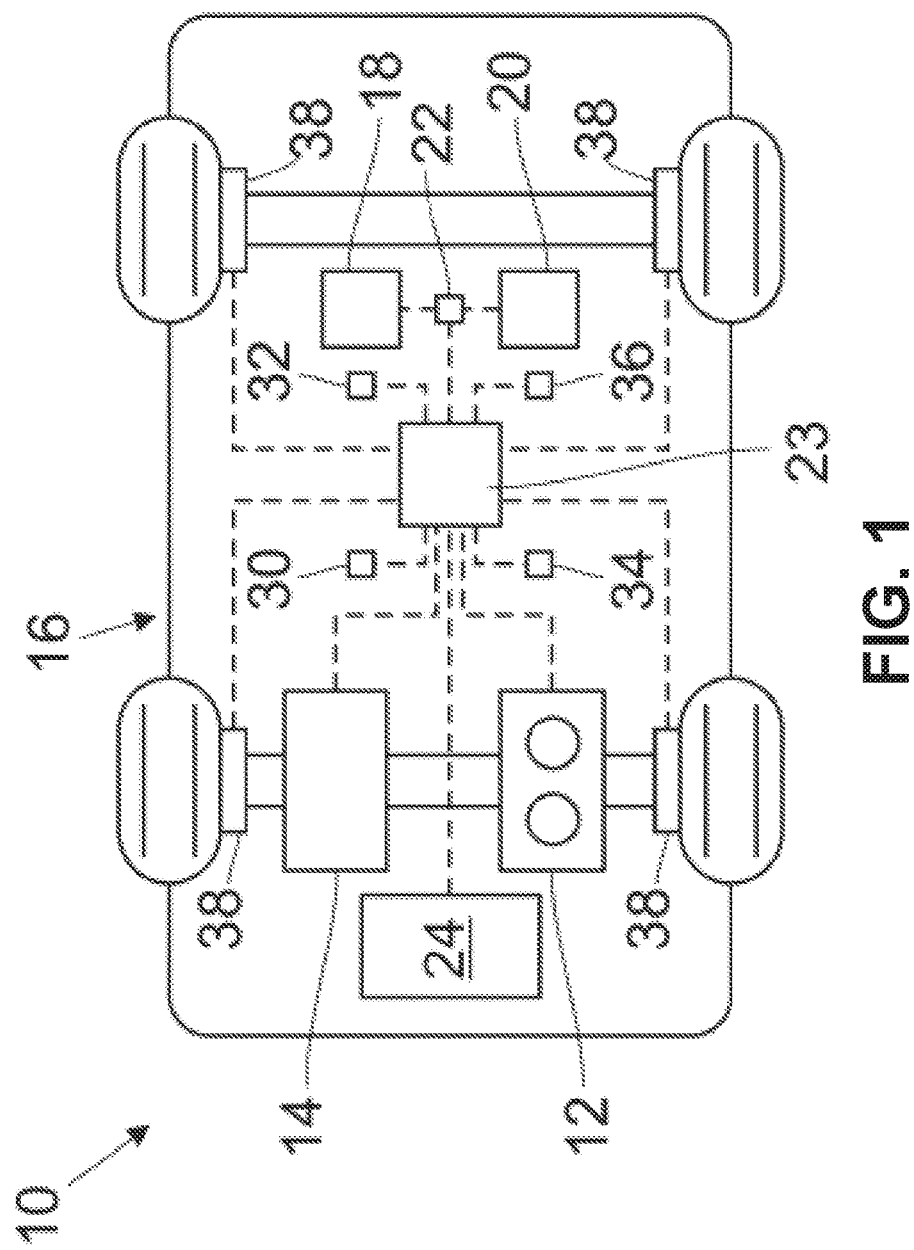
FIG. 1 shows a depiction of a vehicle which can be operated using the method according to the present disclosure.

FIG. 1 shows a vehicle 10 which can be operated using the method according to the present disclosure. The vehicle 10 is designed as a hybrid vehicle 10 and comprises an internal combustion engine 12 and an electric motor 14. The internal combustion engine 12 can be operated either with fossil fuels or with other carriers of chemical energy, in particular with hydrogen. Embodiments of the vehicle 10 comprising only an internal combustion engine 12 and without another drive source are also conceivable, however.

The vehicle 10 is operated using a system 16 which comprises the following components: the system 16 of the vehicle 10 comprises a store 18 (e.g., a first store 18) for electrical energy and a further store 20 (e.g., a second store 20) for storing energy in other forms, in particular chemical energy, which further store can be implemented as a fuel tank. The quantities of energy or electrical energy stored in the store 18 and in the further store 20 can be ascertained and forwarded to a control unit 23 via a store-monitoring device 22. In addition, the system 16 comprises an energy-transfer device 24, with which electrical energy can be exchanged with an external—with respect to the vehicle 10—energy-uptake device 26 of a network 28 (see FIG. 2).

The system 16 of the vehicle 10 also comprises a usage meter 30, with which the quantity of the electrical energy drawn from electrical components installed in the vehicle 10 can be ascertained. Depending on the configuration, the usage meter 30 can also be integrated into the store-monitoring device 22. In addition, driving-state detection device 32 are provided, with which the driving state of the vehicle 10 can be characterized. The driving state can be characterized, for example, on the basis of the speed and the acceleration of the vehicle 10, and on the basis of the speed of the internal combustion engine 12, and can be taken into account by the control unit 23. The position of the vehicle 10 and information regarding the segment attributes, such as the distance remaining to the destination, grades, curves, and road status can be ascertained with reference to a navigation system 34 and can be fed to the control unit 23. The system 16 also comprises an assistance system 36, with which the vehicle 10 can be operated entirely or partially autonomously. If the assistance system 36 is designed to be partially autonomous, the driver himself can determine the driving state of the vehicle 10 to a greater or lesser extent. However, if certain driving states are reached, the assistance system 36 can intervene and transfer the vehicle 10 into other driving states. For example, speeds or accelerations that are too high can be corrected accordingly by the assistance system 36. In the case of fully autonomous assistance systems 36, the driver no longer has any influence on the driving state. Said another way, the autonomous assistance systems 36 may propel the vehicle without input from a vehicle operator.

In addition, the system 16 comprises a recuperation device 38, with which kinetic energy generated during the braking procedure can be converted into electrical energy and fed to the system 16. By using the electric motor 14 or the recuperation device 38 in connection with the electric motor 14 as a generator, the internal combustion engine 12 can be operated at an optimal operating point and any excess power, which has been converted into electrical energy, can then be transferred into the on-board electrical system or into the external network.

Figure 2:
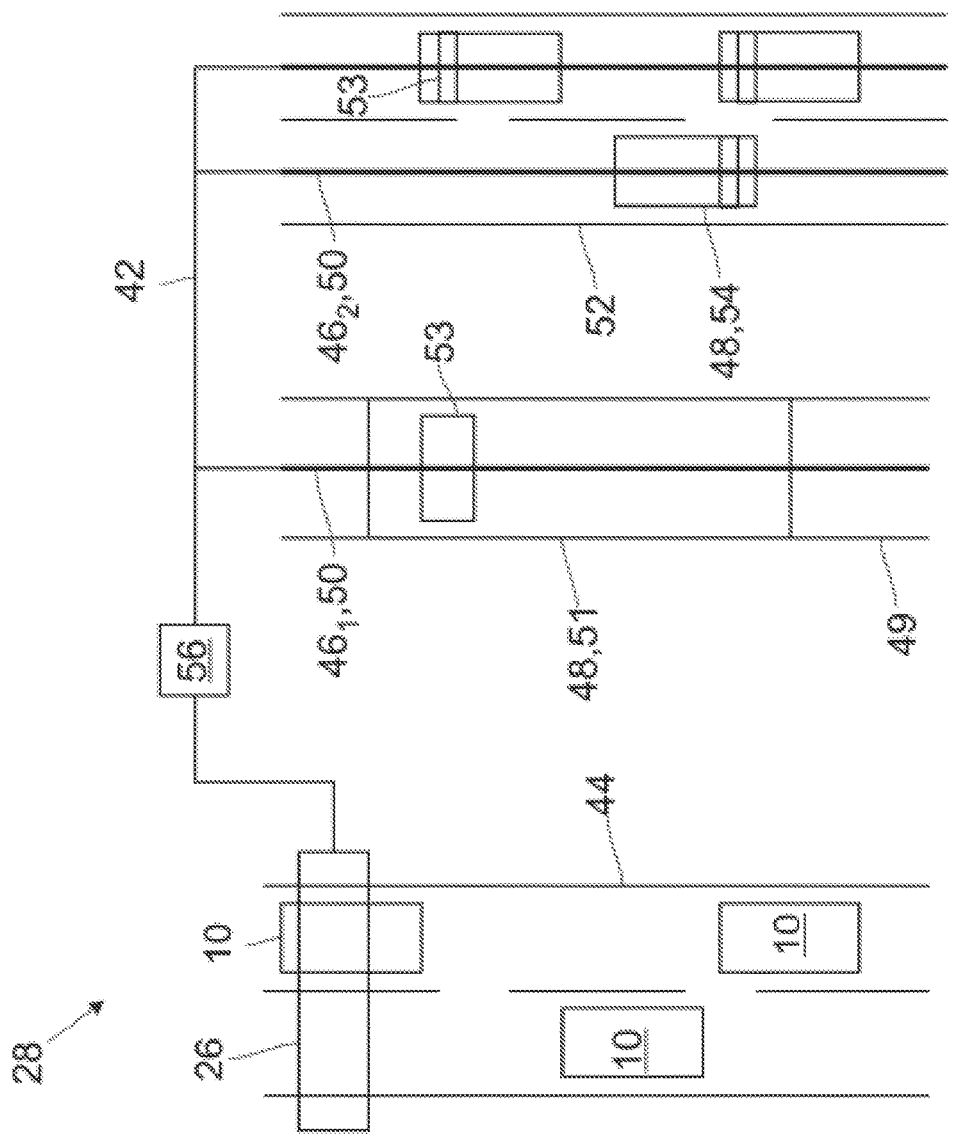
FIG. 2 shows a depiction of a network according to the present description.

FIG. 2 depicts a network 28, with which electrically driven vehicles 48 can be supplied with electrical energy. The network 28 comprises a transfer network 42, with which electrical energy can also be transferred across greater distances. The energy-uptake device 26 is disposed in a section of a road 44, which cooperates with the energy-transfer device 24 of the vehicle 10 in such a way that electrical energy can be transferred between the network 28 and the vehicle 10 according to the present disclosure and, in particular, can be fed from the vehicle 10 into the network 28. For this purpose, the energy-uptake device 26 can comprise induction elements, which are not depicted in greater detail.

The network 28 also comprises a number of energy-exchange devices 46, with which electrical energy can be exchanged with the electrically driven vehicles 48. Disposed in a track section 49 is a first energy-exchange device $46_1$ which comprises overhead contact lines 50, via which the electrically driven vehicles 48 designed as trains 51 can draw electrical energy via current collectors 53. In addition, a second energy-exchange device 46₂ is provided, which is disposed in a further road 52 and likewise comprises overhead contact lines 50, via which trolleybuses 54, for example, can draw electrical energy likewise via current collectors 53.

The network 28 comprises a network store 56, in which electrical energy can be stored and/or converted and stored in another energy form.

The network 28 and the vehicle 10 are operated according to the method according to the present disclosure, in the following manner: if the vehicle 10 is operated by the driver and/or by the assistance system 36 in a driving state, the store-monitoring device 22 ascertains, continuously and in real time, the quantity of electrical energy stored in the electrical-energy store 18 and the quantity of energy stored in the further store 20, in particular the remaining quantity of fuel, and feeds this information to the control unit 23.

In addition, the usage meter 30 ascertains the quantity of electrical energy that has been drawn, over a certain time period before the point in time under consideration, by the electrical components, for example, by the navigation system 34 or the electrical-energy store 18. With the aid of driving-state detection device 32, the instantaneous driving state and the driving state within a certain time period before the point in time under consideration are ascertained and fed to the control unit 23.

The navigation system 34 ascertains the instantaneous position and the distance remaining to the destination, as well as other desired aspects of the trip segment (e.g., traffic).

The control unit 23 compares the quantity of the stored electrical energy with a limit value. If the quantity of the stored electrical energy is above the limit value (e.g., a surplus), the control unit 23 prompts the energy-transfer device 24 to feed a selectable quantity of electrical energy from the vehicle 10 into the energy-uptake device 26 and, therefore, into the network 28.

The control unit 23 can change both the limit value as well as the selectable quantity of electrical energy fed into the energy-uptake device 26 on the basis of information delivered by the driving-state detection device 32, the navigation system 34, the usage meter 30, and the store-monitoring device 22 to the control unit 23, with the objective of maximizing the quantity of electrical energy that can be fed into the network 28, without adversely affecting the proper performance and the driving comfort of the vehicle 10. In addition, the navigation system 34, together with the assistance system 36, can change the route guidance and the driving state in order to reduce the consumption of electrical energy and the fuel consumption.

As shown in FIG. 2, the road 44 has an energy-uptake device 26 only at certain points. These points can be in the vicinity of intersections or traffic lights, for example, where the vehicles are stationary or move slowly, in order to allow enough time for feeding electrical energy from the vehicle 10 into the network 28. The navigation system 34 can take the locations of the energy-uptake devices 26 into account when selecting the route guidance.

Since the vehicle 10 according to the present disclosure comprises an internal combustion engine 12 and, therefore, can access an energy carrier having a high energy density and, in the event that fossil fuel is used, having a high level of availability, the system 16 will operate the vehicle 10 according to the present disclosure in such a way that electrical energy is fed from the vehicle 10 into the network 28. In this way, the energy-uptake device 26 and the energy-transfer device 24 only need to be configured in such a way that the electrical energy flows from the vehicle 10 into the network 28 and not vice-versa, as is the case with the energy-exchange devices 46. Situations can also occur, however, in which the vehicle 10 according to the present disclosure has not stored a sufficient quantity of electrical energy or energy in other forms, and so the trip can be continued at least to the next filling station only if the electrical-energy store 18 of the vehicle 10 is charged. For this exceptional case, the system 16 can control the energy-transfer device 24 of the vehicle 10 in such a way that electrical energy flows from the network 28 into the electrical-energy store 18. In this case, the energy-transfer device 24 and the energy-uptake device 26 are operated in the same manner as the energy-exchange devices 46, with which electrical energy can be exchanged with the vehicles 48 driven by electrical energy.

Figure 3:
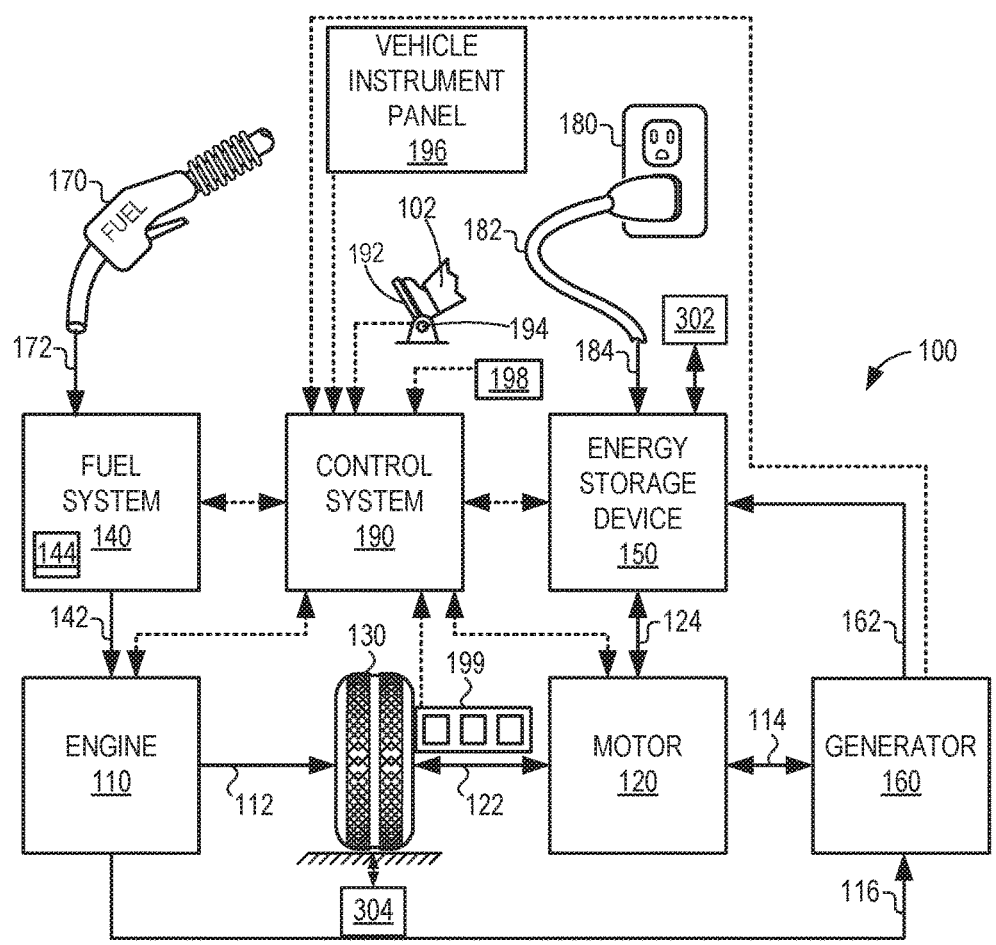
FIG. 3 schematically shows an example vehicle propulsion system

FIG. 3 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking and/or recuperative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge the energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Control system 190 may be substantially identical to control unit 23 of FIG. 1.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110. For example, the energy storage system 150 may receive electrical energy from a first energy-uptake device 302. The energy may be sent over a hard-wired or wireless connection. This enables energy transfer between the energy storage system 150 and the first energy-uptake device to occur during stopped and moving operations of the vehicle. As will be described in greater detail below, energy may transfer between the energy storage system 150 and the first energy-uptake device 302 based on energy stores of the energy storage system 150. For example, if the energy store is greater than a predefined limit value (e.g., 100% charged), then the vehicle has an energy surplus and excess energy flows from the vehicle to the first energy-uptake device 302. Alternatively, if the energy store is insufficient to propel a vehicle to a final destination input by a vehicle operator into a navigation system, then energy may flow from the first energy-uptake device 302 to the energy storage device 150. A second energy-uptake device 304 is shown integrated into a road surface and in-contact with wheels 130. The second energy-uptake device 304 is substantially identical to the first energy-uptake device 302, in one example. Alternatively, the devices are different and the second energy-uptake device 304 may only communicate with the vehicle through physical contact with wheels 130 functioning as a communication medium.

In one example, the first 302 and second 304 energy-uptake devices are external to the vehicle and are configured to receive electrical energy from the vehicle and flow electrical energy to the vehicle. The energy uptake devices 302 and 304 are included in an external network. The external network is a part of a fixed land-based electrical energy infrastructure, wherein the electrical energy flows into the vehicle via one of the energy-uptake devices to the energy storage device. Alternatively, recharging stations may be integrated into the energy uptake devices and configured to flow electrical energy to the vehicle. As such, the energy-uptake devices may only receive electrical energy and the charging stations may receive energy from the energy-uptake device and flow the energy to vehicles.

At any rate, energy-uptake devices through a plurality of ways without departing from the scope of the present disclosure. For example, the uptake devices may be a part of an overhead rail in communication with corresponding couplings located on a roof of a vehicle. Energy flow between the uptake device and the vehicle is determined based on energy demands of the vehicle. If the vehicle has sufficient energy stores, then energy may not flow between the two. If the vehicle has insufficient energy stores, then energy may flow from the uptake device to the vehicle.

Lastly, if the vehicle has more than sufficient energy stores, then energy may flow from the vehicle to the uptake device.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. For example, as described in more detail below, the vehicle instrument panel 196 may include a text-based display which may indicate an open refueling door or a non-functional refueling door switch. The vehicle instrument panel 196 may also include various input portions for receiving an operator input, such as buttons, touch screens, voice input/recognition, etc.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

In one embodiment, the vehicle propulsion system 100 may comprise an internal combustion engine with a large alternator and/or electric generator which is not connected to drive wheel 130, but used only generate electricity. The alternator and/or generator may supply electric current to auxiliary devices and/or other electrical load bearing devices on-board the vehicle. The engine may be operated at mid- to high loads through a range of engine operating parameters. During vehicle conditions where the engine load is greater than a driver demand (e.g., idle and/or low loads), the electrical generator and/or alternator creaters an additional load on the engine. As such, the vehicle consumes more energy, but at a higher efficiency with the ability to deliver the increased energy output to one or more of the first 302 and second 304 energy uptake devices.

In one example, the vehicle propulsion system comprises a the control unit storing instructions in non-transitory memory that when executed enable the control unit to execute a method comprising flowing electrical energy from a vehicle to a network comprising a plurality of energy-uptake devices in response to an energy storage device state of charge being equal to a threshold state of charge, and flowing electrical energy from the network to the vehicle in response to the energy storage device state of charge being insufficient to propel the vehicle to a final destination. The vehicle is stopped, or moving when electrical energy is transferred between the vehicle and the network. A vehicle moving includes decelerating, steady speed, and accelerating operations. Energy insufficiency is estimated based on one or more of a distance remaining between a current position and the final destination, driver behavior, and activated auxiliary devices. The threshold state of charge is equal to a maximum state of charge of the energy storage device and where flowing electrical energy to the network include flowing an energy surplus generated from one or more of recuperative and engine combustion. Electrical energy flows from the vehicle to the network via operating an internal combustion engine in response to the driver selected a fuel pricing benefits option and the energy storage device state of charge being greater than the threshold state of charge, and where fuel is consumed and the engine is combusting. The fuel pricing benefits option is presented to the driver when a price of a unit of fuel is less than a price of a unit of electrical energy, where the unit of fuel provides an identical energy output to the unit of electrical energy. The method further includes a vehicle operator in response to the engine being operated to supply electrical energy to the network. The network directs electrical energy received from the vehicle to one or more different vehicles located in a different location.

Figure 4A:
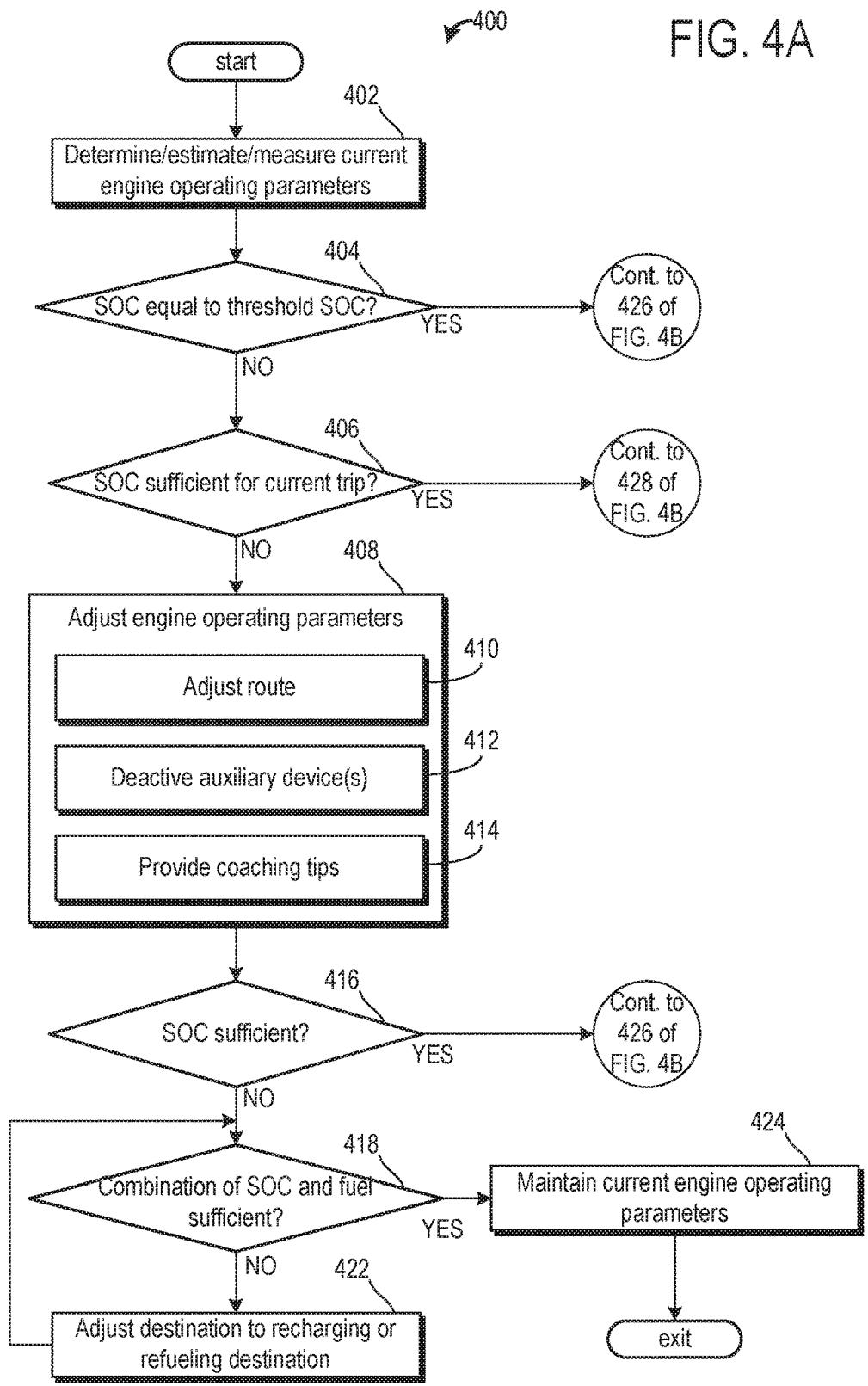
FIGS. 4A and 4B show a method for managing energy transfer between a vehicle and the network.
Figure 4B:
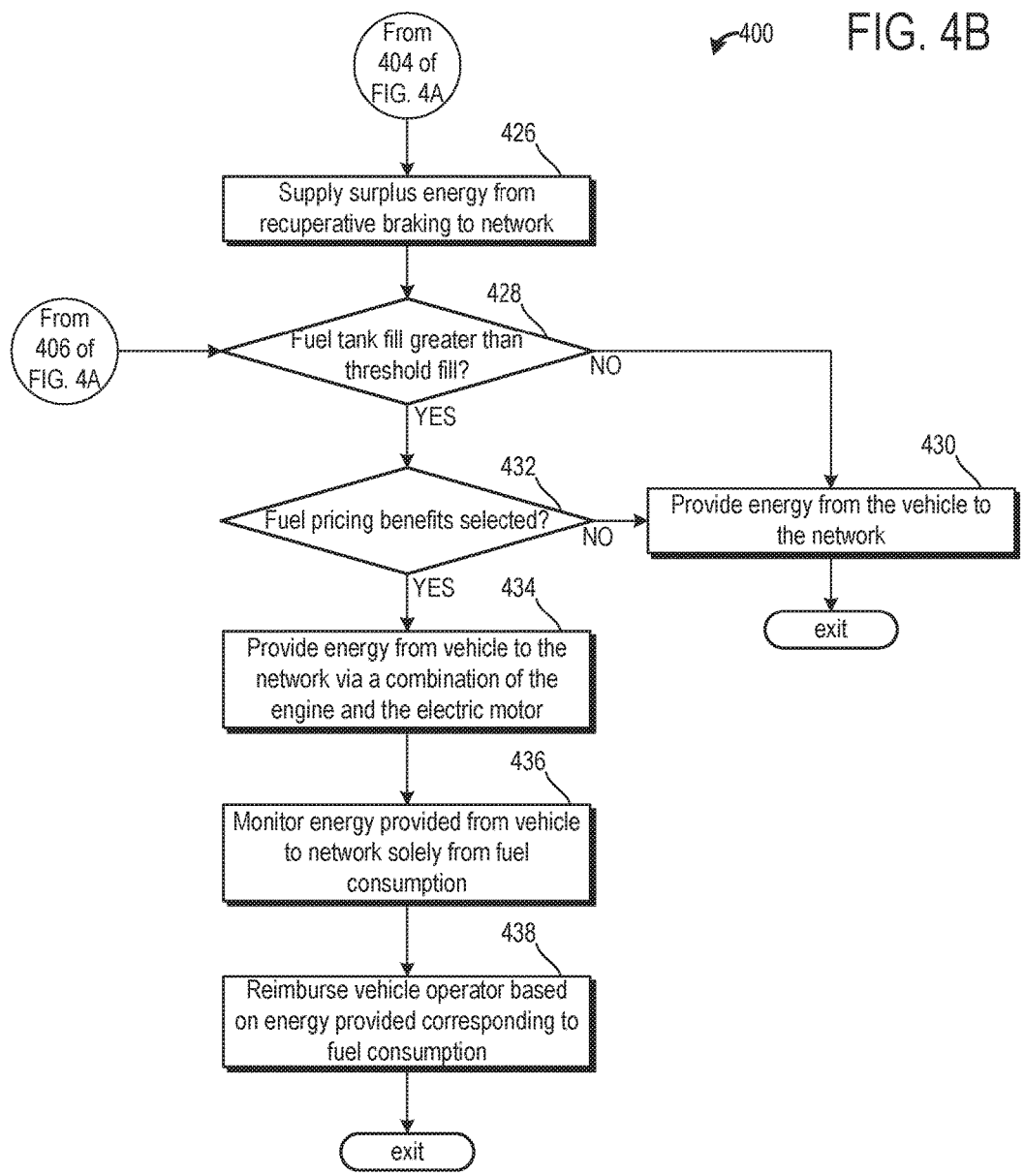

Turning now to FIGS. 4A and 4B, they show method 400 for managing energy flow between a vehicle and a network. It will be appreciated that method 400 may be applied during stationary and impelling operating conditions (e.g., deceleration, steady speed, and/or accelerations). The network is outside of and external to the vehicle. Thus, the network is an external network. Instructions for carrying out method 400 may be executed by a controller (e.g., control unit 23 of FIG. 1 or controller system 190 of FIG. 3) based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, where the method 400 includes determining, estimating, and/or measuring current engine operating parameters. The current engine operating parameters may include but are not limited to one or more of engine speed, engine load, throttle position, ambient humidity, manifold pressure, energy storage device SOC, and air/fuel ratio.

At 404, the method 400 includes determining if the energy storage device SOC is equal to a threshold SOC. In one example, a voltage sensor measures a voltage of the energy consumption device, where the SOC is proportionally related to the voltage. Thus, the SOC increases as the voltage increases. In one example, the threshold SOC is substantially equal to the predefined limit value described above, which corresponds to a 100% fill of the energy storage device. Thus, an energy surplus may occur during energy regenerating vehicle operations including the energy storage device SOC being equal to the threshold SOC such that the energy surplus regenerated cannot be stored on the energy storage device. If the SOC is equal to the threshold SOC, then the method 400 proceeds to 426 described below. Alternatively, if the SOC is less than the threshold SOC, then the method 400 proceeds to 406. Furthermore, the energy storage device is capable of receiving and storing energy when its SOC is less than the threshold SOC.

At 406, the method 400 includes determining if the energy consumption device SOC is sufficient for a current trip. Fuel energy reserve is omitted from the comparison and the method 400 determines if the vehicle is able to reach a final destination via only the energy consumption device (e.g., electrical energy). The energy needed for the current trip is determined based on a final destination input into a navigation system by a vehicle operator and a current location and/or instantaneous location are/is determined via global positioning satellite (GPS). In one example, the energy needed further includes accounting for activated auxiliary devices which may include one or more of air conditioning, heated seats, mobile devices, window heating, wiper blades, lights, and other electrically powered devices. As such, the energy needed is an estimation of electrical power needed to propel the vehicle to the final destination includes a distance remaining and auxiliary device power consumption. Additionally, the energy needed calculation may further include one or more of speed limit, traffic, and driver behavior. In one example, driver behavior includes monitoring driver behavior over a number of different driving conditions and modeling an average power consumption based on past driver behavior measurements. For example, driver behavior is tracked during low-traffic, high-traffic, low-speeds, high-speeds, city driving, highway driving, etc. Thus, the relevant driving conditions are applied to the estimation of the energy needed. If the energy consumption device SOC is greater than or equal to the estimation of energy needed for the current trip, then the method 400 proceeds to 428 of FIG. 4B.

If the energy consumption device SOC is too low to propel the vehicle to the final destination and the SOC is less than the amount needed to reach the final destination, then the method 400 proceeds to 408 to adjust engine operating parameters which may include one or more of adjusting a route 410, deactivating auxiliary devices 412, and providing coaching tips 414. In one example, a route from a current destination to the final destination may be set based on a shortest distance, least traffic, and/or shortest time. However, by adjusting the route at 410, the route may be altered to include one or more charging stations and/or energy-uptake devices to charge the vehicle during the destination. The vehicle may be charged while being driven via a wireless or contact connection. As described above, the tires are in contact with a road surface comprising energy-uptake device and/or charging areas and/or power transfer devices capable of conducting power to the energy storage device of a vehicle with one or more wheels in contact with the road surface. As such, the vehicle may be stopped or moving and receive power from charging areas. Alternatively, the vehicle may couple to overhead lines of a network configured to charge the vehicle. However, the lines (and charging areas) may not initially be present in rural or less trafficked areas as the network is introduced to roadways. Thus, altering the route may include altering the route to include roadways located in more heavily populated regions.

Deactivating auxiliary devices 412 includes deactivating all auxiliary devices in one example. Alternatively, an infotainment system may provide a list of activated auxiliary devices and a power target. The power target is based on a difference between a current SOC and an SOC needed to reach the final destination (e.g., energy needed determined at 404). The vehicle operator may select a number of auxiliary devices to deactivate to meet the power target. For example, the list includes activated auxiliary targets and a corresponding power consumption of each device. The vehicle operator selects which auxiliary devices to deactivate and which devices to keep active. If the vehicle operator does not select a sufficient number of devices to deactivate and the power target is not met, then the route may be adjusted or the coaching tips may be initiated. Alternatively, the method may provide suggestions regarding which auxiliary devices to deactivate. For example, if A/C and heated seats are activated, then the method may suggest deactivating the former or the latter. As another example, if a mobile device is above a threshold charge (e.g., greater than 80% charged), then the method may suggest terminating recharging of the mobile device to aid in meeting the power target.

Coaching tips 414 may include providing instructions through a vehicle infotainment system to be visually and/or audibly relayed to a vehicle operator to decrease an energy penalty. Instructions may include gradually tipping-in, extending vehicle coasting, extending recuperative braking conditions, driving less than a threshold speed (e.g., less than 65 miles per hour), etc. Alternatively, the method may include intrusively applying the above tips. For example, if the vehicle operator aggressively tips-in, then the method 400 may monitor a current vehicle environment and determine if the aggressive tip-in is needed (e.g., accident avoidance, lane change, etc.). If the aggressive tip-in is not needed, then the tip-in is adjusted to gradually sequester power from the energy storage device, thereby decreasing an energy penalty of the tip-in.

At 416, the method 400 includes determining if the energy storage device SOC is sufficient to reach the final destination. If the SOC is sufficient, then the vehicle may reach the final destination solely via electrical power and the method 400 proceeds to 426 of FIG. 4B. If the SOC is insufficient, then the vehicle may not reach the final destination via the current energy storage device SOC in conjunction with the above described adjustments. As such, the method 400 proceeds to 418 to determine if a combination of the energy storage device SOC and a fuel energy output are sufficient to propel the vehicle to the final destination.

The fuel energy output is based on an amount of fuel sensed in a fuel tank via a fuel fill level sensor in the fuel tank. The fuel energy output is proportional to the amount of fuel in the fuel tank such that the fuel energy output increases as the amount of fuel increases. If the combination of the energy storage device SOC and the fuel energy output is sufficient to reach the final destination, then the method 400 proceeds to 420 to maintain current operating parameters. The above adjustments may also be maintained to decrease an amount of fuel consumed during the trip. In this way, the vehicle may prioritize electrical energy consumption over fuel consumption.

If the combination of the energy storage device SOC and the fuel energy output is insufficient to propel the vehicle to the final destination, then the method 400 proceeds to 422 to adjust the final destination to a recharging station or a refueling station. In one example, the final destination is selected based on distance, time, or cost. For example, the route may select the closer of the recharging or refueling stations. Alternatively, the route may select the cheaper (less expensive) of the recharging or refueling stations if the combination of the energy storage device SOC and fuel energy output is sufficient to reach both stations. In this way, the selection may be financially driven.

It will be appreciated that the above described method may be omitted for a network ubiquitous in a transportation infrastructure and/or roadway. That is to say, as the network is installed in the current transportation infrastructure, whether it be through the road surface or overhead rails connecting to vehicles, the above method for determining if a vehicle has sufficient energy to reach a final destination may be omitted. This may be achieved through continuously recharging vehicles being driven on the roadway via energy-uptake devices. In this way, vehicle energy demands are fulfilled.

However, the above described portion of method 400 may assist in the transition between absence and ubiquity of the network. For example, installation of the network may begin in more populated regions of the transportation infrastructure. As such, rural and/or less dense and/or less trafficked areas may utilize the above described portion of the method 400 to manage energy stores of the vehicle. Additionally or alternatively, extended driving trips (e.g., a road trip exceeding 100 miles (161 kilometers)) may utilize the above described portion of method 400 to manage energy stores of the vehicle to maintain energy stores above zero.

Returning to 404 of method 400, if the energy storage device SOC is greater than the threshold SOC, then the method 400 proceeds to 426 where surplus energy is provided to the network. For example, the energy storage device SOC is at 100% and energy generated during recuperative braking and operation of the combustion engine is unable to recharge the energy storage device. Thus, the energy surplus created from the recuperative braking and combustion engine are provided to the network. In one example, the energy surplus is provided from a moving or a stopped vehicle coupled to the network. As described above, the vehicle may constantly be coupled to a ubiquitous network. This may be through a coupling between the road and the vehicle or an overhead rail coupled to the vehicle. As described above, the couplings may be wireless, hard-wired, or direct contact (e.g., touching).

In some embodiments, additionally or alternatively, for a network intermittently located along a roadway, the method 400 may include storing the energy surplus in a second energy storage device configured to transfer the stored energy surplus to the network. Additionally or alternatively, a navigation system may adjust a vehicle path to a final destination when the energy surplus is occurring. The adjusted path may include a greater number of network coupling locations, either through the road or overhead rail, than the initial path.

The method 400 proceeds to 428 following 426 or 406, as described above. At 428, the method 400 includes determining if the fuel tank fill is greater than a threshold volume. In one example, the threshold volume is based on a fuel volume in the fuel tank being greater than half-full. If the fuel tank fill is less than the threshold volume, then the method 400 proceeds to 430 to continue providing energy from the vehicle to the network and does not utilize engine combustion to provide energy to the network. Said another way, the engine is not intrusively operated to provide energy to the network. Energy transfer between the vehicle and the network may be conducted during stationary and/or moving operations. As described above, an amount of energy transferred from the vehicle to the network may be based on a difference between the energy storage device SOC and the energy surplus. For example, the energy stores of the energy storage device are not accessed or used to transfer energy and only the surplus energy generated from vehicle operations is transferred to the network.

In some embodiments, the engine is operated in a steady-state vehicle operating condition and the electric motor is operated during transient vehicle operating conditions (e.g., acceleration). If the energy storage device SOC is equal to the threshold SOC, then engine combustion may provide electrical energy to the network so long as energy stores of the energy storage device are not diminished. However, the engine is not operated during transient conditions and the engine does not provide electrical energy to the network during transient conditions. Thus, the engine is not intrusively operated during conditions where fuel is not consumed.

If the fuel tank fill is greater than the threshold volume, then the method 400 proceeds to 432 to determine if fuel pricing benefits is selected. Fuel pricing benefits is an option presented to a vehicle operator through the infotainment system used to ascertain a desire of the vehicle operator to be financially compensated for providing energy to the network by consuming fuel. For example, if a price of a unit of fuel is cheaper than a price of a unit of electricity, where the unit of fuel provides a similar energy output as the unit of electricity, then burning fossil fuels during the energy surplus is financially advantageous. If the fuel pricing benefits is not selected, then the method 400 proceeds to 430 described above. As such, the engine is not intrusively operated and energy provided to the network from the engine is based on activation of the engine in response to hybrid vehicle operating parameters.

If the fuel pricing benefits is selected, then the method 400 proceeds to 434 to provide energy from the vehicle to the network via a combination of the engine and the electric motor. In one example, the engine is operated intrusively to provide additional energy to the network. For example, during normal hybrid operating parameters using a combination of the electric motor and the engine, a majority of power is provided from the electric motor during accelerations and a majority of power is provided from the combustion engine during steady state operation. Intrusive engine operation may include utilizing engine operation during acceleration events and other events normally including a majority of power being supplied from the electric motor to provide power to the network. While a majority of the power used to propel the vehicle during these events is provided from the electric motor, a majority of the power output from the engine is used to feed energy to the network.

In some embodiments, additionally or alternatively, the method includes providing energy from a vehicle where the wheels are only driven via the engine. An alternator and/or electric generator is driven by at least one or more of the engine and a battery, where the alternator and/or electric generator is configured to power auxiliary devices (e.g., A/C system) and other vehicle components. However, the alternator and/or electric generator is unable to drive the wheels. As described above with respect to FIG. 3, the engine is operated between mid to high loads independent of driver demand. In response to a driver demand corresponding to a low load, the electric generator and/or alternator creates an additional load on the engine corresponding to the difference between the engine operating load and the driver demand. Said another way, the energy difference between the engine power output and the driver demand drives the alternator and/or electric generator and feeds energy to the network. Thus, the power output of the engine is divided to drive the wheels and turn the alternator and/or electric generator. Once the driver demand is met and the wheels are sufficiently powered, the remainder of the engine power output is used to drive the alternator and/or electric generator, where the remainder of the engine power output corresponds to an amount of power fed to the network.

In one example, an engine may have an optimal brake-specific fuel consumption (BSFC) of 220 g/kWh. BSFC values may be as high as 500-600 g/kWh at low loads and/or idle. As such, running an engine at 1500 rpm and 3 bar brake mean effective pressure (BMEP) with a BSFC of 250 g/kWh, in response to a driver demand corresponding to a low load, may consume less, even in total mass fuel, than otherwise running the engine at 1500 rpm and one bar BMEP, which corresponds to the low load. This enables the engine to increase thermodynamic efficiency and reduce energy consumption at the same time under certain conditions. In this way, a vehicle may participate in power transfer with the network if it is an internal combustion vehicle, a hybrid vehicle, and/or an electric vehicle.

At 436, the method 400 includes monitoring energy provided from the vehicle engine to the network. The energy provided may be based data stored in a look-up table having a single input. For example, the energy received by the network from an individual car during an energy surplus driving operation further including the fuel pricing benefits being selected may be correlated to an amount of fuel consumed. The price of fuel determined earlier in the method may be used to extrapolate a monetary refund for the driver. In one example, the monetary refund is equal to half the difference between the unit cost of electricity and the unit cost of fuel.

At 438, the method 400 includes reimbursing the vehicle operator the monetary refund described above. Alternatively, the vehicle operator may receive credits to use toward future energy transfers from the network to the vehicle. In one example, the financial benefit of the credits may be 25% greater than the monetary refund. For example, if the monetary refund is $10, then the credits are worth $12.50. In this way, a financial incentive is available to vehicle operators capable of decreasing energy consumption.

Thus, the method comprises flowing electrical energy to and from a vehicle to an external network based on an energy storing device SOC relative to a threshold SOC. If the energy storing device SOC is equal to the threshold SOC, then the vehicle may flow electrical energy to the external network. Alternatively, if the energy storing device SOC is less than the threshold SOC, then the external network may flow electrical energy to the vehicle. The external network may be a land based network with rails, contact lines, or other coupling elements configured to couple to a moving and/or stationary vehicle. As such, the external network may remain in communication with a vehicle independent of its motion.

In this way, a network comprising energy-uptake devices and/or recharging stations across a roadway may communicate with hybrid vehicles located thereon. In one example, energy is transferred between the network and a hybrid vehicle. The technical effect of transferring energy between the network and a vehicle is to manage energy stores in individual vehicle. By doing this, a vehicle in an energy surplus may flow energy to the network and the network may either store the energy or flow the energy to a vehicle in an energy demand.

An embodiment of a method for operating a vehicle comprising an internal combustion engine comprises operating the vehicle in a driving state according to instructions of a driver and/or an assistance system, ascertaining a quantity of electrical energy stored in a store of the vehicle via a store-monitoring device, comparing the ascertained quantity of the stored electrical energy with a pre-definable limit value via a control unit, and feeding a selectable quantity of electrical energy from the vehicle into an external energy-uptake device having an energy-transfer device in response to the quantity of the electrical energy stored in the vehicle exceeding the pre-definable limit value. A first example of the method further includes ascertaining a quantity of electrical energy that was consumed via a usage meter, and adjusting a quantity of electrical energy fed into the external energy-uptake device via the control unit with consideration for the ascertained quantity of consumed electrical energy. A second example of the method, optionally including the first example, further includes where the store-monitoring device ascertains the quantity of energy stored in further stores of the vehicle, and the quantity of stored energy is taken into account by the control unit. A third example of the method, optionally including the first and/or second examples, further includes detecting a driving state of the vehicle and generating corresponding driving-state signals using a driving-state detection device, and feeding the driving-state signals to the control unit which takes the driving-state signals into account when changing the pre-definable value and the selectable quantity. A fourth example of the method, optionally including one or more of the first through third examples, further includes where the quantity of consumed electrical energy and the driving state with respect to a pre-definable time are tracked. A fifth example of the method, optionally including one or more of the first through fourth examples, further includes detecting the instantaneous position of the vehicle and the planned destination, generating corresponding position and destination signals via a navigation system, and feeding the position and destination signals to the control unit which takes the position and destination signals into account when changing the pre-definable value and the selectable quantity. A sixth example of the method, optionally including one or more of the first through fifth examples, further includes where the vehicle is a hybrid further comprising an electric motor, and where the internal combustion engine and electric motor are operated to minimize energy penalties. A seventh example of the method, optionally including one or more of the first through sixth examples, further includes where the control unit controls a navigation system in such a way that a route guidance is adjusted as a function of an ascertained quantity of consumed electrical energy and the quantity of energy stored in the store and/or energy stored in further stores.

A system for a hybrid vehicle comprising a store-monitoring device for ascertaining the quantity of electrical energy stored in a store of the vehicle which is operated in a driving state according to instructions from a driver and/or an assistance system, energy-transfer device coupled in the vehicle for feeding a selectable quantity of electrical energy from the vehicle into an external energy-uptake device, and a control unit for comparing the ascertained quantity of the stored electrical energy with a pre-definable limit value, where the control unit stores instructions in non-transitory memory that when executed enable the control unit to operate the energy-transfer device in such a way that, in response to the quantity of electrical energy stored in the vehicle exceeding the pre-definable limit value, the selectable quantity of electrical energy is fed from the vehicle into the external energy-uptake device. A first example of the system further includes a network for supplying hybrid vehicles with electrical energy, comprising a transfer network for transferring electrical energy, a number of energy-uptake devices configured to transfer electrical energy to the hybrid vehicles and a number of energy-exchange devices, and where electrical energy can be exchanged with the vehicles driven by electrical energy. A second example of the system optionally including the first examples further includes where the network comprises one or more network stores for electrical energy, where the one or more network stores comprise an energy-converting device which is suitable for carrying out a power-to-gas method or a power-to-fuel method, or is connected to such an energy-converting device for operating an internal combustion engine for transferring energy from the vehicle to the one or more network stores.

A method comprises flowing electrical energy from a vehicle to an external network comprising a plurality of energy-uptake devices in response to an energy storage device state of charge relative to a threshold state of charge, and flowing electrical energy from the external network into the vehicle in response to the energy storage device state of charge being determined to be insufficient to propel the vehicle to a final destination. A first example of the method further includes where the vehicle is stopped, or moving when electrical energy is transferred between the vehicle and the network in response to the energy storage device state of charge being equal to the threshold state of charge, wherein the external network is a part of a fixed land-based electrical energy infrastructure, wherein the electrical energy flows into the vehicle via the energy-uptake device to the energy storage device. A second example of the method, optionally including the first example, further includes where insufficiency is estimated based on one or more of a distance remaining between a current position and the final destination, driver behavior, and activated auxiliary devices. A third example of the method, optionally including the first and/or second examples, further includes where the threshold state of charge is equal to a maximum state of charge of the energy storage device and where flowing electrical energy to the network include flowing an energy surplus generated from one or more of recuperative and engine combustion. A fourth example of the method, optionally including one or more of the first through third examples, further includes where electrical energy flows from the vehicle to the network via operating an internal combustion engine in response to the driver selected a fuel pricing benefits option and the energy storage device state of charge being greater than the threshold state of charge, and where fuel is consumed and the engine is combusting. A fifth example of the method, optionally including one or more of the first through fourth examples, further includes where the fuel pricing benefits option is presented to the driver when a price of a unit of fuel is less than a price of a unit of electrical energy, where the unit of fuel provides an identical energy output to the unit of electrical energy. A sixth example of the method, optionally including one or more of the first through fifth examples, further includes reimbursing a vehicle operator in response to the engine being operated to supply electrical energy to the network. A seventh example of the method, optionally including one or more of the first through sixth examples, further includes where the network directs electrical energy received from the vehicle to one or more different vehicles located in a different location. An eighth example of the method, optionally including one or more of the first through seventh examples, further includes flowing electrical energy between the vehicle and the network occurs during stationary, decelerating, steady-state, and accelerating vehicle operating conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily demanded to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle comprising an internal combustion engine and a controller, comprising:
    operating the vehicle via the controller in a driving state according to instructions of a driver and/or an assistance system,
    ascertaining a quantity of electrical energy stored in a store of the vehicle via a store-monitoring device,
    comparing the ascertained quantity of the stored electrical energy with a pre-definable limit value via a control unit, and
    feeding a selectable quantity of electrical energy from the vehicle into an external energy-uptake device having an energy-transfer device in response to the quantity of the electrical energy stored in the vehicle exceeding the pre-definable limit value.

2. The method of claim 1, further comprising ascertaining a quantity of electrical energy that was consumed via a usage meter, and adjusting a quantity of electrical energy fed into the external energy-uptake device via the control unit with consideration for the ascertained quantity of consumed electrical energy.

3. The method of claim 1, wherein the store-monitoring device ascertains the quantity of energy stored in further stores of the vehicle, and the quantity of stored energy is taken into account by the control unit.

4. The method as claimed in claim 3, further comprising detecting a driving state of the vehicle and generating corresponding driving-state signals using a driving-state detection device, and feeding the driving-state signals to the control unit which takes the driving-state signals into account when changing the pre-definable value and the selectable quantity.

5. The method of claim 1, wherein the quantity of consumed electrical energy and the driving state with respect to a pre-definable time are tracked.

6. The method of claim 1, further comprising detecting the instantaneous position of the vehicle and the planned destination, generating corresponding position and destination signals via a navigation system, and feeding the position and destination signals to the control unit which takes the position and destination signals into account when changing the pre-definable value and the selectable quantity.

7. The method of claim 1, wherein the vehicle is a hybrid further comprising an electric motor, and where the internal combustion engine and electric motor are operated to minimize energy penalties.

8. The method of claim 1, wherein the control unit controls a navigation system in such a way that a route guidance is adjusted as a function of an ascertained quantity of consumed electrical energy and the quantity of energy stored in the store and/or energy stored in further stores.

9. A system for a hybrid vehicle comprising:
a store-monitoring device for ascertaining the quantity of electrical energy stored in a store of the vehicle which is operated in a driving state according to instructions from a driver and/or an assistance system;
energy-transfer device coupled in the vehicle for feeding a selectable quantity of electrical energy from the vehicle into an external energy-uptake device, and
a control unit for comparing the ascertained quantity of the stored electrical energy with a pre-definable limit value, where
the control unit stores instructions in non-transitory memory that when executed enable the control unit to operate the energy-transfer device in such a way that, in response to the quantity of electrical energy stored in the vehicle exceeding the pre-definable limit value, the selectable quantity of electrical energy is fed from the vehicle into the external energy-uptake device.

10. The system of claim 9, further comprising a network for supplying hybrid vehicles with electrical energy, comprising a transfer network for transferring electrical energy, a number of energy-uptake devices configured to transfer electrical energy to the hybrid vehicles and a number of energy-exchange devices, and where electrical energy can be exchanged with the vehicles driven by electrical energy.

11. The system of claim 10, wherein the network comprises one or more network stores for electrical energy, where the one or more network stores comprise an energy-converting device which is suitable for carrying out a power-to-gas method or a power-to-fuel method, or is connected to such an energy-converting device for operating an internal combustion engine for transferring energy from the vehicle to the one or more network stores.

12. A method for managing a vehicle with energy storage devices, actuators, and an electronic controller, comprising:
via the electronic controller, adjusting the actuators including flowing electrical energy from a vehicle to an external network comprising a plurality of energy-uptake devices in response to an energy storage device state of charge relative to a threshold state of charge, and flowing electrical energy from the external network into the vehicle in response to the energy storage device state of charge being determined to be insufficient to propel the vehicle to a final destination.

13. The method of claim 12, wherein the vehicle is stopped, or moving when electrical energy is transferred between the vehicle and the network in response to the energy storage device state of charge being equal to the threshold state of charge, wherein the external network is a part of a fixed land-based electrical energy infrastructure, wherein the electrical energy flows into the vehicle via the energy-uptake device to the energy storage device.

14. The method of claim 12, wherein insufficiency is estimated based on one or more of a distance remaining between a current position and the final destination, driver behavior, and activated auxiliary devices.

15. The method of claim 12, wherein the threshold state of charge is equal to a maximum state of charge of the energy storage device and where flowing electrical energy to the network include flowing an energy surplus generated from one or more of recuperative and engine combustion.

16. The method of claim 15, wherein electrical energy flows from the vehicle to the network via operating an internal combustion engine in response to the driver selecting a fuel pricing benefits option and the energy storage device state of charge being greater than the threshold state of charge, and where fuel is consumed and the engine is combusting.

17. The method of claim 16, wherein the fuel pricing benefits option is presented to the driver when a price of a unit of fuel is less than a price of a unit of electrical energy, where the unit of fuel provides an identical energy output to the unit of electrical energy.

18. The method of claim 16, further comprising reimbursing a vehicle operator in response to the engine being operated to supply electrical energy to the network.

19. The method of claim 12, wherein the network directs electrical energy received from the vehicle to one or more different vehicles located in a different location.

20. The method of claim 12, wherein flowing electrical energy between the vehicle and the network occurs during stationary, decelerating, steady-state, and accelerating vehicle operating conditions.

* * * * *